US012263456B2

(12) United States Patent
Roy et al.

(10) Patent No.: US 12,263,456 B2
(45) Date of Patent: Apr. 1, 2025

(54) CONTINUOUS BLENDER

(71) Applicants: SCITECH CENTRE, Maharashtra (IN); ACG PAM PHARMA TECHNOLOGIES PVT. LTD., Maharashtra (IN)

(72) Inventors: Cook Roy, Maharashtra (IN); Sumit Waghmare, Maharashtra (IN); Swapnil Desai, Maharashtra (IN); Karan Singh, Maharashtra (IN)

( * ) Notice: Subject to any disclaimer, the term of this patent is extended or adjusted under 35 U.S.C. 154(b) by 1011 days.

(21) Appl. No.: 17/288,716

(22) PCT Filed: Oct. 25, 2019

(86) PCT No.: PCT/IB2019/059169
§ 371 (c)(1),
(2) Date: Apr. 26, 2021

(87) PCT Pub. No.: WO2020/084585
PCT Pub. Date: Apr. 30, 2020

(65) Prior Publication Data

US 2021/0394136 A1 Dec. 23, 2021

(30) Foreign Application Priority Data

Oct. 25, 2018 (IN) ............................ 201821040352

(51) Int. Cl.
*B01F 27/07* (2022.01)
*B01F 27/701* (2022.01)
(Continued)

(52) U.S. Cl.
CPC .......... *B01F 27/701* (2022.01); *B01F 27/071* (2022.01); *B01F 35/212* (2022.01); (Continued)

(58) Field of Classification Search
CPC ............................ B01F 27/071; B01F 27/073
(Continued)

(56) References Cited

U.S. PATENT DOCUMENTS 558,738 A * 4/1896 Neal .................... B01F 27/071 366/326.1
994,991 A * 6/1911 Fernholtz ............. F26B 17/205 366/326.1
(Continued)

OTHER PUBLICATIONS

International Search Report from corresponding International Application No. PCT/IB2019/059169 mailed on Feb. 5, 2020.

*Primary Examiner* — David L Sorkin
(74) *Attorney, Agent, or Firm* — Nitin Kaushik

(57) ABSTRACT

The present disclosure relates to a blender having blades whose orientation angle is changeable, even while the blender is in operation. The blender 100 includes a housing 110 with inlets (140*a*, 140*b*) to allow inflow of ingredients and an outlet (140*c*) to allow outflow of blended ingredients. The blender 100 incorporates an external shaft 122 with the blades 123 rotatably coupled to it, and an internal shaft 121 inside the external shaft 122. The blender 100 incorporates a first driving unit 130 to rotate the external shaft 122 and blades 123 about a direction along a length of the housing 110 to allow blending of the ingredients. The internal shaft 121 having engaging means coupled to back of the blades 123 such that a linear displacement of the internal shaft 121 using a second driving unit 121, enables change in orientation of the blades 123.

13 Claims, 7 Drawing Sheets

(51) Int. Cl.

| | |
|---|---|
| ***B01F 35/212*** | (2022.01) |
| ***B01F 35/221*** | (2022.01) |
| ***B01F 35/71*** | (2022.01) |
| ***B01F 35/75*** | (2022.01) |
| *B01F 101/22* | (2022.01) |

(52) U.S. Cl.
CPC ................ *B01F 35/221422* (2022.01); *B01F 35/718051* (2022.01); *B01F 35/75471* (2022.01); *B01F 2101/22* (2022.01)

(58) Field of Classification Search
USPC ........................................................ 366/326.1
See application file for complete search history.

(56) References Cited

U.S. PATENT DOCUMENTS

| | | | | |
|---|---|---|---|---|
| 1,210,727 A * | 1/1917 | Tyson | ................... | B01F 27/071 366/326.1 |
| 4,721,448 A * | 1/1988 | Irish | ...................... | B30B 11/221 425/173 |
| 6,550,959 B2 | 4/2003 | Huber et al. | | |
| 7,488,502 B2 | 2/2009 | Morin et al. | | |

* cited by examiner

CONTINUOUS BLENDER

RELATED APPLICATION DATA

This application is a national phase application of International Application No. PCT/IB2019/059169 filed Oct. 25, 2019, which claims priority to Indian application number IN201821040352 filed Oct. 25, 2018. The entireties of the aforementioned applications are incorporated herein by reference.

TECHNICAL FIELD

The present invention relates to continuous blenders used for mixing pharmaceutical, nutraceutical ingredients to be filled in capsules and for producing tablets. More particularly, the present invention relates to changing orientation of blades deployed in continuous blenders for mixing of pharmaceutical ingredients.

BACKGROUND

Background description includes information that may be useful in understanding the present invention. It is not an admission that any of the information provided herein is prior art or relevant to the presently claimed invention, or that any publication specifically or implicitly referenced is prior art.

Pharmaceutical manufacturing of solid oral dosage forms is carried out either by batch processing or continuous processing. Drug regulatory agencies are pushing pharmaceutical companies to adopt a continuous manufacturing process. Continuous manufacturing involves pharmaceutical ingredients such as Active Pharmaceutical Ingredient (APIs), Excipients, Lubricants, and the like, being fed in dosage quantities through different feeders into a continuous blender. The pharmaceutical ingredients are mixed in the continuous blender and the mixture is then provided for further processing to capsule filling machines, tablet pressing machines, etc. for manufacturing of the capsule and tablets.

Continuous blender is an important component in any continuous manufacturing process. Continuous blender ensures that a homogenous mixture is provided to the capsule filling machines, tablet presses, etc. Continuous blender typically includes an impeller with blades mounted thereon at a particular orientation, which rotates at a predefined speed for a resident time to achieve the homogenous mixture of the pharmaceutical ingredients. Based on the formulation of a drug to be manufactured, the configuration of the continuous blender including the blade geometry and orientation, the speed of rotation of the impeller, the number of blades, their configuration and the resident time is decided to achieve a desired mixing of the pharmaceutical ingredients.

There have been several endeavours to make continuous blenders for continuous manufacturing. U.S. Pat. No. 6,109,779 mentions a continuous mixer wherein control of the mixing conditions is achieved by an adjustable discharge opening adjustable in size being arranged between a discharge region and a mixing space of the continuous mixer. In other words, U.S. Pat. No. 6,109,779 speaks about varying the mixing conditions by adjusting the size of the discharge opening of the continuous mixer. By doing this, the time which the pharmaceutical ingredients spend inside the enclosed volume of the mixer changes, causing the mixing conditions to change. However, by adjusting the size of the discharge opening, flow velocity of the mixture flowing per unit time from the discharge opening will vary. This will affect the operations of the machine next in line for further processing and may cause it to function erratically. Further, the impeller of the continuous mixer mentioned in U.S. Pat. No. 6,109,779 has fixed type of blades mounted thereon. Hence in case of change of formulation of a drug, the entire existing continuous mixer and/or the impeller would have to be replaced with a new impeller and/or continuous mixer having different configuration. As a result the manufacturing process will have to be halted leading to economic losses to a company.

US publication 20060175761 provides a device for processing/mixing bulk materials having a container wherein continuous mixing of the materials can take place by an implement driven therein about a horizontal axis by an external rotary drive. Between the container and the rotary drive is provided a connection unit to which is detachably fastened the container and in which a shaft of the implement is detachably retained and is detachably attached to the rotary drive, to enable dismantling of the container and the implement for cleaning and also for replacement. However, for dismantling/replacement of the container and/or the implement, the entire manufacturing process will have to be halted resulting in economic losses to a company.

Portillo et al (2008 and 2009) mentioned two continuous blenders with an adjustable number of flat blades that can be fitted in the mixing zone of the blender for continuous blending. Vanarase et al. mentioned an impeller for a continuous blender, that can be fitted with 12 triangular-shaped blades equally spaced along the axis of rotation, wherein the angle of the blades with respect to the shaft can be changed to control the rate of “back mixing”. Glatt GCG-70 is another blender available in the market that has 24 evenly spaced blades along the length of a tube of the blender. Three different types of blades are provided with the Glatt blender, and the blades can be oriented at different angles to setup different configurations of the blender.

However, all the continuous blenders/mixers known in the art are equipped with non-removable blades having fixed blade geometries, whereby the blenders and/or their impellers necessarily have to be replaced in the event of the blending efficiency not being as per the requirement of a drug to be manufactured or in case of change of formulation of a drug, resulting in an entire manufacturing process being halted which defeats the very purpose of continuous manufacturing process. As the blades are non-removable, the entire impeller would also have to be replaced in the event of malfunctioning of even one blade again resulting in the entire manufacturing process being halted leading to economic losses There is, therefore, a need for a continuous blender with retrofittable blades which does not have to be replaced in case of inefficient blending or change of formulation of a drug, and wherein a homogenous mixture of pharmaceutical ingredients as per the desired blending efficiency or the changed formulation can be achieved by simply changing the orientation of the blades to vary the mixing conditions, even while the blender is in operation and the manufacturing process is going on, without affecting discharge flow velocity of the mixed/blended pharmaceutical ingredients

OBJECTS OF THE PRESENT DISCLOSURE

Some of the objects of the present disclosure, which at least one embodiment herein satisfies are as listed herein below.

It is an object of the present disclosure to provide a continuous blender, which allows variation of angle of orientation of blades while the blender is in operation.

It is an object of the present disclosure to provide a continuous blender, which allows variation in mixing conditions by changing angle of orientation of blades.

It is an object of the present disclosure to provide a continuous blender with retrofittable blades, which can be quickly replaced in the event of their malfunctioning to facilitate easy maintenance of the continuous blender.

It is an object of the present disclosure to provide a continuous blender, which provides a homogenous mixture of pharmaceutical ingredients as per a desired blending efficiency or a changed formulation.

It is an object of the present disclosure to provide a continuous blender, which provides a homogenous mixture of pharmaceutical ingredients as per a desired blending efficiency or a changed formulation while the manufacturing process is going on.

It is an object of the present disclosure to provide a continuous blender, which allows variation of angle of orientation of blades without affecting the discharge flow velocity of the mixed/blended pharmaceutical ingredients.

It is an object of the present disclosure to provide a continuous blender, which automatically changes the angle of orientation of the blades and/or speed of rotation (RPM) of the blender.

It is an object of the present disclosure to provide a continuous blender, which is incorporated with sensors to check blending characteristics, provide feedback to control system and change mixing parameters accordingly.

SUMMARY

The present invention relates to continuous blenders used for mixing pharmaceutical ingredients, nutraceutical ingredients to be filled in capsules and for producing tablets. More particularly, the present invention relates to changing orientation of blades deployed in continuous blenders for mixing of pharmaceutical ingredients.

An aspect of the present disclosure pertains to a continuous blender comprising: an external shaft comprising a bore, and a plurality of customizable blades rotatably mounted on an outer surface of the external shaft, each of the plurality of customizable blades may be configured to change an angle of orientation; an internal shaft configured longitudinally inside the bore of the external shaft and may be adapted to move linearly inside the bore along a central axis along a length of the external shaft, wherein the plurality of customizable blades may be coupled with a plurality of engaging means positioned on an outer surface of the internal shaft such that: each of the plurality of engaging means may engage with the corresponding blade and said each of the plurality of customizable blades may be adapted to rotate based on the linear motion of the internal shaft and movement of the each of the plurality of customizable blades may facilitate blending and shifting of the one or more components inside the blender.

In an aspect, the external shaft may be configured longitudinally inside a housing, the housing comprising at least two inlets to facilitate inflow of one or more ingredients into the housing, and at least one outlet to exit the blended one or more ingredients from the housing.

In an aspect, the at least one outlet may comprise a first sensor to monitor one or more parameters of the one or more exiting ingredients from the housing to thereby control the continuous blender based on the one or more monitored parameters.

In an aspect, the at least one outlet may be controlled based on the one or more monitored parameters.

In an aspect, the blender may comprise: a first driving unit coupled to the external shaft to rotate the external shaft about the central axis, wherein the rotation of the external shaft may enable rotation of the internal shaft, and the plurality of customizable blades about the first direction to facilitate blending of the one or more ingredients; and a second driving unit rotatably coupled to the internal shaft and may be configured to enable linear movement of the internal shaft inside the bore of external shaft along the central axis of the external shaft; wherein the linear movement of the internal shaft along the first direction and the second direction may facilitate the linear movement of the plurality of engaging means to rotate the plurality of customizable blades at a predefined angle, at their corresponding position about an axis perpendicular to the central axis of the external shaft.

In an aspect, said each of the plurality of customizable blades may comprise a pin configured to couple with an associated engaging means selected from the plurality of engaging means positioned on the outer surface of the internal shaft.

In an aspect, the plurality of customizable blades may be rotatably coupled to the external shaft by a plurality of blade mounting assemblies, and wherein the plurality of customizable blades may be removably coupled to the plurality of blade mounting assemblies.

In an aspect, the plurality of engaging means may comprise a plurality of first extrusions positioned on the outer surface of the internal shaft such that the plurality of first extrusions may engage with a plurality of first slots of the plurality of blade mounting assemblies.

In an aspect, the plurality of engaging means may comprise a plurality of second slots provided on the outer surface of the internal shaft such that the plurality of second slots may engage with a plurality of second extrusions of the plurality of blade mounting assemblies.

In an aspect, the plurality of blade mounting assemblies may be removably coupled to the external shaft by a tapered threading tapping means, and wherein the internal shaft may be rotatably coupled to the second driving unit by a ball-bearing means.

In an aspect, the plurality of customizable blades may be positioned at predefined positions on the outer surface of the external shaft along the length of the external shaft and circumferentially around the external shaft such that no gap may be present between at least one edge of each of the two adjacent customizable blades along the length of the external shaft.

In an aspect, the blender may comprise at least two first valves configured at the at least two inlets to control the inflow of the one or more ingredients into the housing, and wherein the blender may comprise a second valve configured at the at least one outlet to control the outflow of the blended one or more ingredients from the housing.

In an aspect, the blender may comprise one or more sensors configured to monitor one or more blending parameters of the blender in real-time and generate a first set of signals corresponding to the monitored one or more blending parameters, and wherein the one or more blending parameters may comprise any or a combination of rotational speed of the external shaft, linear displacement of the internal shaft, angle of the plurality of customizable blades, inflow of the one or more ingredients into the housing, outflow of the blended one or more ingredients from the housing.

In an aspect, the blender may comprise a control unit operatively coupled to the one or more sensors, the first driving unit, the second driving unit, the at least two first valves, the at least one second valve, and wherein the control unit may be configured to receive the first set of signals from the one or more sensors, and send a second set of signals to any or a combination of the first driving unit, the second driving unit, the at least two first valves, the at least one second valve to configure the one or more parameters of the blender.

In an aspect, the blender may be configured to rotate the plurality of customizable blades at the predefined angle in real time, at their corresponding position about an axis perpendicular to the central axis of the external shaft and simultaneously rotating the plurality of customizable blades about its position.

In an aspect, the plurality of customizable blades may be configured to facilitate back mixing and forward pushing of the one or more ingredients within the housing.

Various objects, features, aspects and advantages of the inventive subject matter will become more apparent from the following detailed description of preferred embodiments, along with the accompanying drawing figures in which like numerals represent like components Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

DETAILED DESCRIPTION

Figure 1:
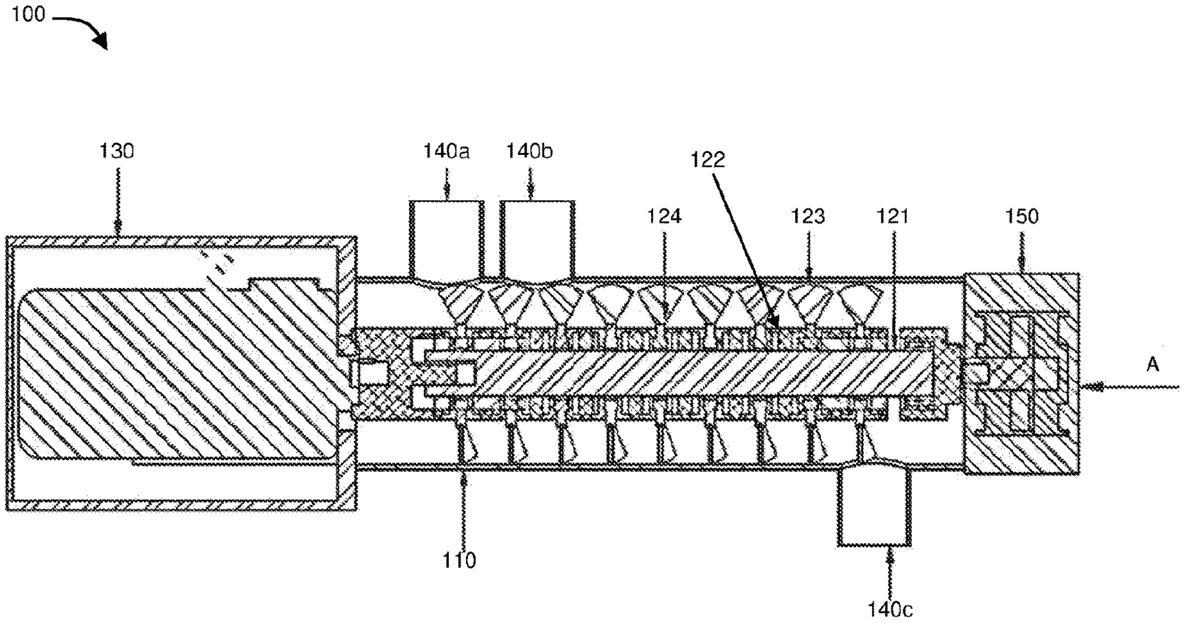
FIG. 1 illustrates an exemplary cross-sectional view of the proposed blender, in accordance with an embodiment of the present disclosure, to elaborate upon its working.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

It is to be appreciated that while various embodiments of the present disclosure elaborate upon a continuous blender for mixing pharmaceutical ingredients, however, the present invention is not just limited to mixing of pharmaceutical ingredients, and the present invention can also be implemented for mixing and blending non pharmaceutical ingredients.

The present invention relates to continuous blenders used for mixing pharmaceutical ingredients, nutraceutical ingredients to be filled in capsules and for producing tablets. More particularly, the present invention relates to changing orientation of blades deployed in continuous blenders for mixing of pharmaceutical ingredients.

An aspect of the present disclosure elaborates upon a continuous blender including: an external shaft including a bore, and a plurality of customizable blades rotatably mounted on an outer surface of the external shaft, each of the plurality of customizable blades can be configured to change an angle of orientation; an internal shaft configured longitudinally inside the bore of the external shaft and can be adapted to move linearly inside the bore along a central axis along a length of the external shaft, wherein the plurality of customizable blades can be coupled with a plurality of engaging means positioned on an outer surface of the internal shaft such that: each of the plurality of engaging means can engage with the corresponding blade and said each of the plurality of customizable blades can be adapted to rotate based on the linear motion of the internal shaft and movement of the each of the plurality of customizable blades can facilitate blending and shifting of the one or more components inside the external shaft.

In an embodiment, the external shaft can be configured longitudinally inside the housing, the housing including at least two inlets to facilitate inflow of one or more ingredients into the housing, and at least one outlet to exit the blended one or more ingredients from the housing.

In an embodiment, the at least one outlet can include a first sensor to monitor one or more parameters of the one or more exiting ingredients from the housing to thereby control the continuous blender based on the one or more monitored parameters.

In an embodiment, the at least one outlet can be controlled based on the one or more monitored parameters.

In an embodiment, the blender can include: a first driving unit coupled to the external shaft to rotate the external shaft about the central axis, wherein the rotation of the external shaft enables rotation of the internal shaft, and the plurality of customizable blades about the central axis of the external shaft to facilitate blending of the one or more ingredients; and a second driving unit rotatably coupled to the internal shaft and can be configured to enable linear movement of the internal shaft inside the bore of the external shaft along the central axis of the external shaft; wherein the linear movement of the internal shaft along the first direction and the second direction can facilitate the linear movement of the plurality of engaging means to rotate the plurality of customizable blades at a predefined angle, at their corresponding position about an axis perpendicular to the central axis of the external shaft.

In an embodiment, said each of the plurality of customizable blades can include a pin configured to couple with an associated engaging means selected from the plurality of engaging means positioned on the outer surface of the internal shaft.

In an embodiment, the plurality of customizable blades can be rotatably coupled to the external shaft by a plurality of blade mounting assemblies, and wherein the plurality of customizable blades can be removably coupled to the plurality of blade mounting assemblies.

In an embodiment, the plurality of engaging means can include a plurality of first extrusions positioned on the outer surface of the internal shaft such that the plurality of first extrusions can engage with a plurality of first slots of the plurality of blade mounting assemblies.

In an embodiment, the plurality of engaging means can include a plurality of second slots provided on the outer surface of the internal shaft such that the plurality of second slots can engage with a plurality of second extrusions of the plurality of blade mounting assemblies.

In an embodiment, the plurality of blade mounting assemblies can be removably coupled to the external shaft by a tapered threading tapping means, and wherein the internal shaft can be rotatably coupled to the second driving unit by a ball-bearing means.

In an embodiment, the plurality of customizable blades can be positioned at predefined positions on the outer surface of the external shaft along the length of the external shaft and circumferentially around the external shaft such that no gap can be present between at least one edge of each of the two adjacent customizable blades along the length of the external shaft.

In an embodiment, the blender can include at least two first valves configured at the at least two inlets to control the inflow of the one or more ingredients into the housing, and wherein the blender can include a second valve configured at the at least one outlet to control the outflow of the blended one or more ingredients from the housing.

In an embodiment, the blender can include one or more sensors configured to monitor one or more blending parameters of the blender in real-time and generate a first set of signals corresponding to the monitored one or more blending parameters, and wherein the one or more blending parameters can include any or a combination of rotational speed of the external shaft, linear displacement of the internal shaft, angle of the plurality of customizable blades, inflow of the one or more ingredients into the housing, outflow of the blended one or more ingredients from the housing.

In an embodiment, the blender can include a control unit operatively coupled to the one or more sensors, the first driving unit, the second driving unit, the at least two first valves, the at least one second valve, and wherein the control unit can be configured to receive the first set of signals from the one or more sensors, and send a second set of signals to any or a combination of the first driving unit, the second driving unit, the at least two first valves, the at least one second valve to configure the one or more parameters of the blender.

In an embodiment, the blender can be configured to rotate the plurality of customizable blades at the predefined angle in real time, at their corresponding position about an axis perpendicular to the central axis of the external shaft and simultaneously rotating the plurality of customizable blades about the central axis of the external shaft.

In an embodiment, the plurality of customizable blades can be configured to facilitate back mixing and forward pushing of the one or more ingredients within the housing FIG. 1 illustrates an exemplary cross-sectional view of the proposed blender, in accordance with an embodiment of the present disclosure, to elaborate upon its working.

As illustrated, in an aspect, the proposed blender 100 can include a housing 110 (also referred to as an outer shell 110, herein). The housing 110 can include at least two inlets 140*a*, 140*b* (collectively referred to as inlets 140*a*, 140*b*, herein) to facilitate inflow of one or more ingredients (also referred to as ingredients, herein) to be blended, into the housing 110. The blender 100 can include at least one outlet 140*c* (also referred to as outlet 140*c*, herein) for discharging the blended ingredients. In an exemplary embodiment, Active Pharmaceutical Ingredient (APIs) can be fed through the inlet 140*a* and the Excipient can be fed through the inlet 140*b*.

In an embodiment, the ingredients can be any or a combination same type of substance and different type of substance, in form of powder, granules, and a combination thereof, but not limited to the likes.

In an implementation, the blender 100 can be a part of a continuous manufacturing capsule filling line, and may have at least two upstream machines and at least one downstream machine connected thereto. The upstream machines connected to the blender may include, but not limited to, Gravimetric LIW Feeder for API, Gravimetric LIW Feeder for Excipient, Gravimetric LIW Feeder for Lubricant, Continuous Powder Milling Machine, and the like. The downstream machines connected to the blender can include, but are not limited to, Automatic Capsule Filling Machine, Roller Compaction Machine, High Speed Tablet Press, and the like.

The ingredients can be mixed as per requirement in the housing to create a blend which can then be discharged through the outlet 140*c*. This blend can then be provided to the downstream machines for further processing In an embodiment, the blender 100 can include an external shaft 122 configured longitudinally inside the housing 110. The external shaft 122 can include a bore, and a plurality of customizable blades 123 (also referred to as blades 123, herein) rotatably coupled to the external shaft 122 on its outer surface. The blender 100 can further include an internal shaft 121 configured longitudinally inside the bore of the external shaft 122 and can be adapted to move linearly inside the bore along a central axis along a length of the external shaft 122. The external shaft 122 and the internal shaft 121 (collectively referred to as impeller, herein) can be configured to rotate about the central axis of the external shaft 122.

In an embodiment, the blender 100 can include a first driving unit 130 coupled to the impeller at its one end and configured to rotate the external shaft 122 and the internal shaft 121 about the central axis of the external shaft 122. The rotation of the impeller can enable the blades 123 to also rotate about the central axis of the external shaft 122, thereby facilitating blending of the ingredients in the housing 110.

In an embodiment, the blender 100 can include a second driving unit 150 rotatably coupled to the internal shaft 121 and can be configured to enable linear movement of the internal shaft 121 inside the bore of external shaft 122 along the central axis of the external shaft 122 to enable rotation of the blades about an axis perpendicular to the central axis of the external shaft 122.

In an embodiment, the blades 123 can be rotatably coupled to the external shaft 122 by a plurality of blade mounting assemblies 124 (also referred to as blade mounting assemblies 124, herein) The blades 123 can be removably coupled to the blade mounting assemblies 124. The blades 123 can be retrofitted and/or snap-fitted to the blade mounting assemblies.

In an embodiment, the blades 123 can positioned at predefined positions on the outer surface of the external shaft 122 along the length of the external shaft 122 and circumferentially around the external shaft 122 such that no gap is present between at least one edge of each of the two adjacent blades along the length of the external shaft 122, thereby removing any blind spot between the two adjacent blades.

In an embodiment, the blender 100 can include at least two first valves configured at the at least two inlets 140*a*, 140*b* to control the inflow of the ingredients into the housing 110, and a second valve configured at the outlet 140*c* to control the outflow of the blended ingredients from the housing 110.

In an embodiment, the blender 100 can include one or more sensors configured to monitor one or more blending parameters of the blender 100 in real-time and generate a first set of signals corresponding to the monitored one or more blending parameters. The one or more blending parameters can be any or a combination of rotational speed of the external shaft, linear displacement of the internal shaft, angle of the plurality of blades, inflow of the ingredients into the housing, outflow of the blended ingredients from the housing, but not limited to the likes.

In an embodiment, the one or more sensors can include rotational sensor mounted on a drive shaft of the first driving unit 130 to monitor rotational speed of the impeller. A linear sensor can be mounted on a shaft of the second driving unit 150 to measure the displacement of the internal shaft 121 and the angle of blades 123. A position sensor can be mounted at an opening of the outlet 140*c* to measure the size of outlet opening and monitor outflow of the blended ingredients. Another set of position sensor can be mounted at the openings of the inlets 140*a*, 140*c* to measure size of an opening of the outlet 140*c* and monitor outflow of the ingredients. The sensors at the outlet can be configured to monitor the mixing characteristics of the powder or blended ingredients flowing out of the blender 100.

In an embodiment, the blender 100 can include a control unit operatively coupled to the one or more sensors, the first driving unit 130, the second driving unit 150, the at least two first valves, the at least one second valve, and configured to receive the first set of signals from the one or more sensors. The control unit can be configured to send a second set of signals to any or a combination of the first driving unit 130, the second driving unit 150, the at least two first valves, the at least one second valve to configure the one or more parameters of the blender, to control the blending process as required.

In an embodiment, a user can command the control unit to control the inflow of ingredients, angle of the blades, the retention time of the ingredients in the blender, rotational speed of the blades to provide desired blending of the ingredients.

The user can remotely operate the blender 100 using a Human Machine Interface (HMI). The HMI can be operatively coupled to the blender 100 and can be configured to receive the first set of signals corresponding to the monitored blending attributes of the blender to provide a real-time status of the blender 100. The user can send instructions to the control unit remotely using the HMI, which can send the second set of signals to the blender 100 to control the operation of the blender 100, accordingly.

In an exemplary embodiment, the HMI can be any or a combination of a smart phone, tablet, and computer, but not limited to the likes.

The HMI can include a plurality of buttons to initiate a number of functions in the blender 100, which can include start first driving unit, stop first driving unit, emergency stop, adjustment of rotational speed of mixing, adjustment of angle of blades, adjusting opening size of the outlet, opening an outlet flap for undesired powder/blend removal, closing of outlet flap for desired powder/blend removal, start inflow through first inlet, start inflow through second inlet, flow rate adjustment of first inlet, flow rate adjustment of second inlet. the user or operator can configure the blender 100 using the plurality of buttons of the HMI.

The HMI can include a display to provide graphical representation of the one or more blended ingredients attributes such as blend uniformity, particle, size, and particle distribution, but not limited to the likes. The display can further provide a graphical representation of the one or more blending attributes of the blender.

In an embodiment, the control unit can be configured to receive the first set of signals form the one or more sensors in real time and send a corresponding second set of signals to any or a combination of the first driving unit 130, the second driving unit 150, the at least two first valves, the at least one second valve to configure the one or more parameters of the blender, to control the blending process.

In an embodiment, the blade mounting assembly 124 can be configured to accommodate different types of blades, based on the ingredients to be blended and the required powder attributes of the blend.

In an exemplary embodiment, the blades 123 can be configured to rotate about an angle between 0 to 180 degrees about their position on the external shaft 122.

In an exemplary embodiment, a total number of 40 blades and a minimum of 10 blades can be positioned on the external shaft 122 to provide optimum blending of the ingredients.

In an exemplary embodiment, the blades 123 can be positioned at a gap of 40 mm between two adjacent blades along the length of the shaft.

Figure 2A:
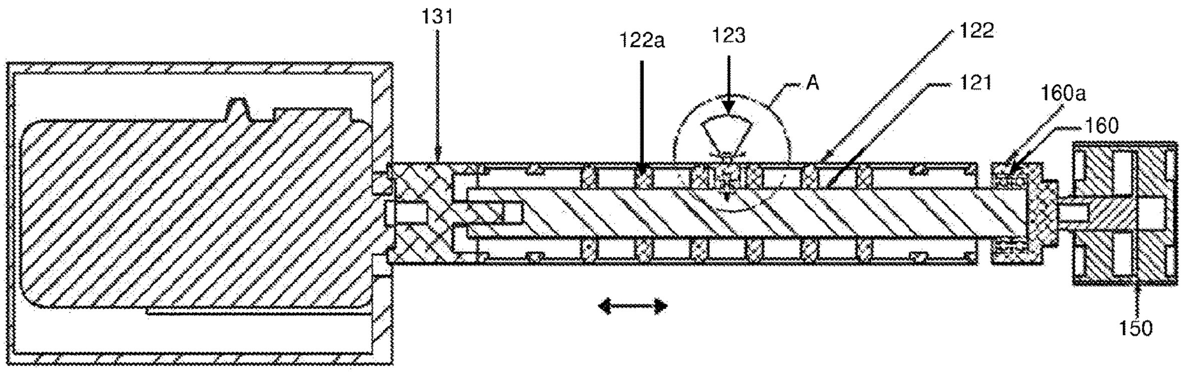
FIG. 2A illustrates an exemplary cross-sectional view the proposed blender without a housing, in accordance with an embodiment of the present disclosure.

FIG. 2A illustrates an exemplary cross-sectional view the proposed blender without a housing, in accordance with an embodiment of the present disclosure.

As illustrated, in an embodiment, the blender 100 can include a second driving unit 150 rotatably coupled to the internal shaft 121 and can be configured to enable linear movement of the internal shaft 121 inside the bore of external shaft 122 along the central axis of the external shaft 122.

In an embodiment, a plurality of engaging means (engaging means) can be positioned between the external shaft 122 and an outer surface of the internal shaft 121 such that each of the engaging means can engage with the blades 123. The linear movement of the internal shaft 121 along the central axis of the external shaft 122 can facilitate the linear movement of the engaging means to rotate the blades 123 at a predefined angle, at their corresponding position about an axis perpendicular to the central axis of the external shaft 122.

In an embodiment, the external shaft 122 can be hollow and can accommodate the blade mounting assemblies 124 on its external surface. The external shaft 122 can include a plurality first linear bearing/bushes 122*a* (also referred to as linear bearing/bushes 122*a*, herein) on its internal surface equidistantly/non-equidistantly placed in the bore of the external shaft 122. The internal shaft 121 can pass through the external shaft 122 and can rest on the linear bearing/bushes 122*a* inside the external shaft 122. The linear bearing/bushes 122*a* can rotatably couple the blades 123 or blades mounting assemblies 124 to the external shaft 122.

In an embodiment, the internal shaft at its other end can be rotatably coupled to the second driving unit by a ball/roller bearing 160. A portion of the internal shaft 121 at its other end can be enclosed within the second driving unit 150 by the ball/roller bearing 160, which can be located inside a bearing housing 160*a*, thereby providing support to the internal shaft 121 at its other end. The internal shaft 121, in addition to its rotation about its own axis imparted by the first driving unit 130, can also be linearly displaced along the length of the housing through a linear motion imparted by the second driving unit 150. Thus, the blender 100 can rotate the blades 123 at the predefined angle in real time, at their corresponding position about an axis perpendicular to the central axis of the external shaft 122 and simultaneously rotating the blades 123 about the central axis of the external shaft 122.

In an embodiment, the first driving unit 130 can include one or more motors to induce rotational motion in the impeller. The first driving unit 130 can be placed inside a casing, which provides a physical separation between the first driving unit 130 and impeller and hence the blending area (the housing 110).

In an embodiment, the internal shaft 121 and the external shaft 122 at one end thereof can be coupled to the first driving unit 130 by a shaft mounting flange 131 that can transfer the rotational motion and power from the first driving unit to the shafts (121, 122) to rotate the shafts about their own horizontal axis of rotation, thereby inducing rotational motion of the impeller about the central axis of the external shaft 122. The shaft mounting flange 131 can be coupled to shafts (121, 122) of the impeller by a key/coupling (not shown).

In an embodiment, the first driving unit 130 can include an assembly of electrical motor and a gearbox. The electrical motor can be an induction motor and the gear box can be a helical gear box, but not limited to the likes. The external shaft 122 can be coupled to the gear box, which transfer the rotational motion of the electrical motor to the external shaft 122 or the impeller.

In an embodiment, the second driving unit 150 can be a linear actuator comprising any or a combination of pneumatic actuator, mechanical actuators, and electro-mechanical actuators, but not limited to the likes.

Figure 2B:
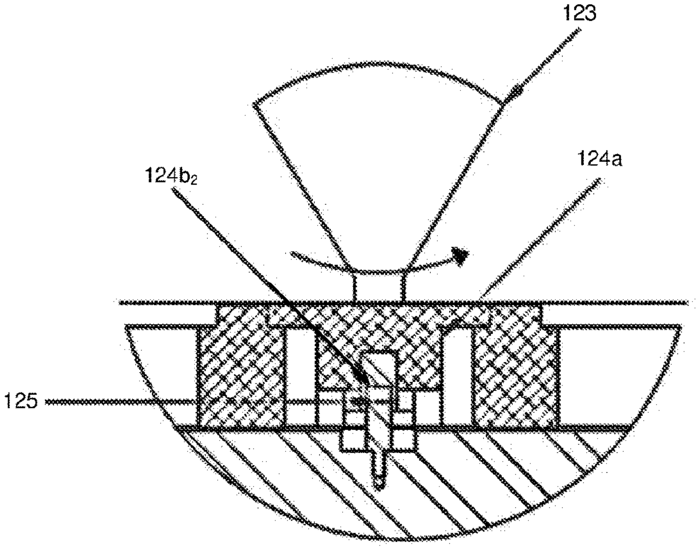
FIG. 2B illustrates a cross-sectional view illustrating an exemplary embodiment of the mounting of a blade on an external shaft of the proposed blender, in accordance with an embodiment of the present disclosure.

FIG. 2B illustrates a cross-sectional view illustrating an exemplary embodiment of the mounting of a blade on an external shaft of the proposed blender, in accordance with an embodiment of the present disclosure.

Figure 3:
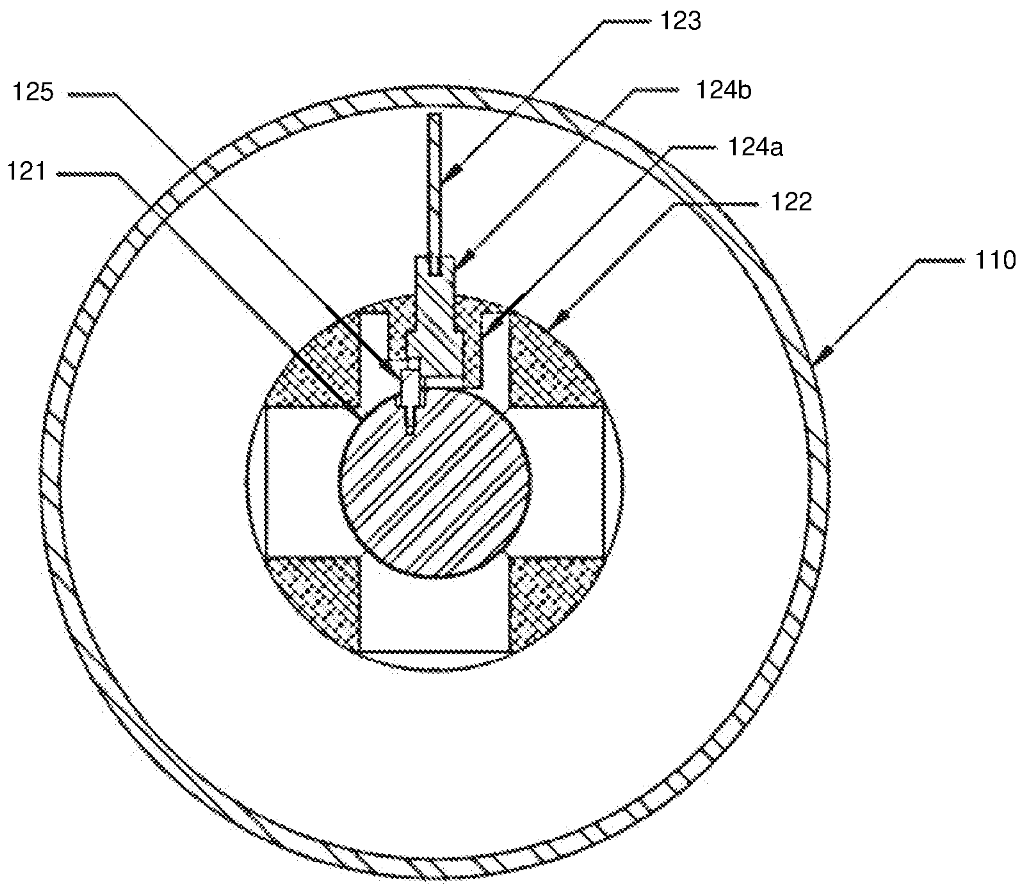
FIG. 3 illustrates a side view illustrating the exemplary embodiment of the mounting of the blade on the external shaft of the proposed blender, in accordance with an embodiment of the present disclosure.

FIG. 3 illustrates a side view illustrating the exemplary embodiment of the mounting of the blade on the external shaft of the proposed blender, in accordance with an embodiment of the present disclosure.

Referring to FIGS. 2B and 3, an exemplary embodiment of the mounting of the blades on the external shaft is disclosed. The internal shaft 121 can include a plurality of pins 125 (also referred to as pin, herein) of the engaging means. The blade mounting assemblies 124 can a blade mounting housing 124*a* and a blade mounting piece 124*b*. The blade mounting housing 124*a* can be clamped to the external shaft 122 with a small clearance between a bottom surface of the blade mounting housing 124 and the internal shaft 121 so as to prevent any hindrance to the linear displacement of the internal shaft 121.

In an embodiment, the blade mounting piece 124*b* can be rotatably placed inside the blade mounting housing 124*a* by a tapered threaded tapping means. This can provide rotational freedom to the blade mounting piece 124*b* and hence to the blade 123 which is clamped in the blade mounting piece 124*b*.

In an embodiment, the blade mounting piece 124*b* can include a slot/groove 124*b*1 on a top end thereof to enable the blades 123 to be snap-fitted and clamped therein, and a cavity 124*b*2 at a bottom end thereof to accommodate the pin 125. The pin 125 can be clamped onto the internal shaft 121 such that the linear displacement of the internal shaft correspondingly slides the pins 125 linearly.

In an embodiment, the internal shaft 121 can include a plurality of equidistant/non-equidistant horizontal slits on its surface to enable the linear sliding of the pins 125 therein. The positioning of the pin 125 on the internal shaft 121 can be such that the upper end of the pin 125 is located inside the cavity 124*b*2 of the blade mounting piece 124*b* to enable the pin 125 to cooperate with the blade mounting piece 124*b*, whereby the linear sliding of the pin 125 can cause the blade mounting piece 124*b* to be angularly displaced about its axis, and thereby causing the blades 123 to be angularly displaced about the central axis of the external shaft 122. Thus, the pin 125 can convert the linear motion of the internal shaft 121 into angular rotational motion of the blade mounting piece 124*b* thereby changing the angle of orientation of the blades 123.

In an embodiment, the engaging means can include a plurality of first extrusions (the pins 125), which can engage with a plurality of first slots (the cavity 124*b*2) such that the plurality of first extrusions can engage with a plurality of first slots of the plurality of blade mounting assemblies 124

Without limiting the scope of the invention, and solely for the sake of brevity and understanding of the invention, the mounting of a single pin onto the internal shaft and its cooperation with the single blade mounting piece is illustrated. It may be appreciated by a person skilled in the art that each pin is mounted in a similar manner and cooperates with each blade mounting piece to convert the linear motion of the internal shaft into angular rotational motion of each blade mounting piece to change the angle of orientation of each blade, all falling within the scope of the present invention.

Figure 4A:
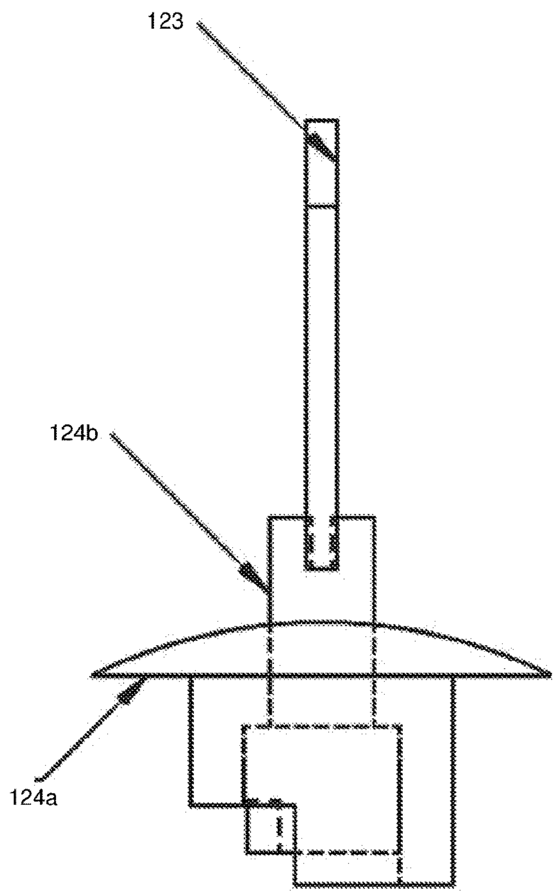
FIGS. 4A and 4 B illustrate embodiments of a blade mounting assembly of the proposed blender, in accordance with an embodiment of the present disclosure.
Figure 4B:
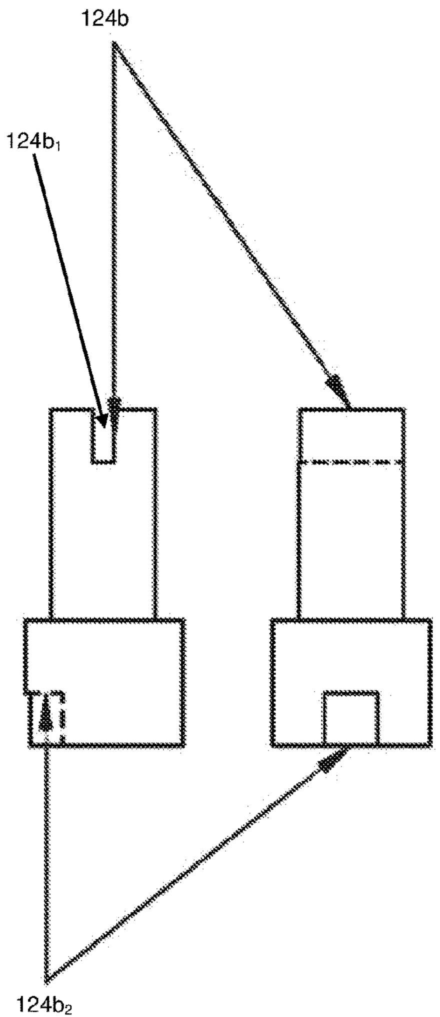

FIGS. 4A and 4 B illustrate embodiments of a blade mounting assembly of the proposed blender, in accordance with an embodiment of the present disclosure.

As illustrated, in an embodiment, the blade mounting assemblies 124 can a blade mounting housing 124*a* and a blade mounting piece 124*b*. The blade mounting housing 124*a* can be clamped to the external shaft 122 with a small clearance between a bottom surface of the blade mounting housing 124 and the internal shaft 121 so as to prevent any hindrance to the linear displacement of the internal shaft.

In an embodiment, the blade mounting piece 124*b* can be rotatably placed inside the blade mounting housing 124*a*. This can provide rotational freedom to the blade mounting piece 124*b* and hence to the blade 123 which is clamped in the blade mounting piece 124*b*. The blade mounting piece 124*b* can include a slot/groove 124*b*1 on a top end thereof to enable the blades 123 to be snap-fitted and clamped therein. The blade mounting piece 124*b* can include a cavity 124*b*2 at a bottom end thereof to accommodate the pin 125 of the internal shaft 121.

Figure 5:
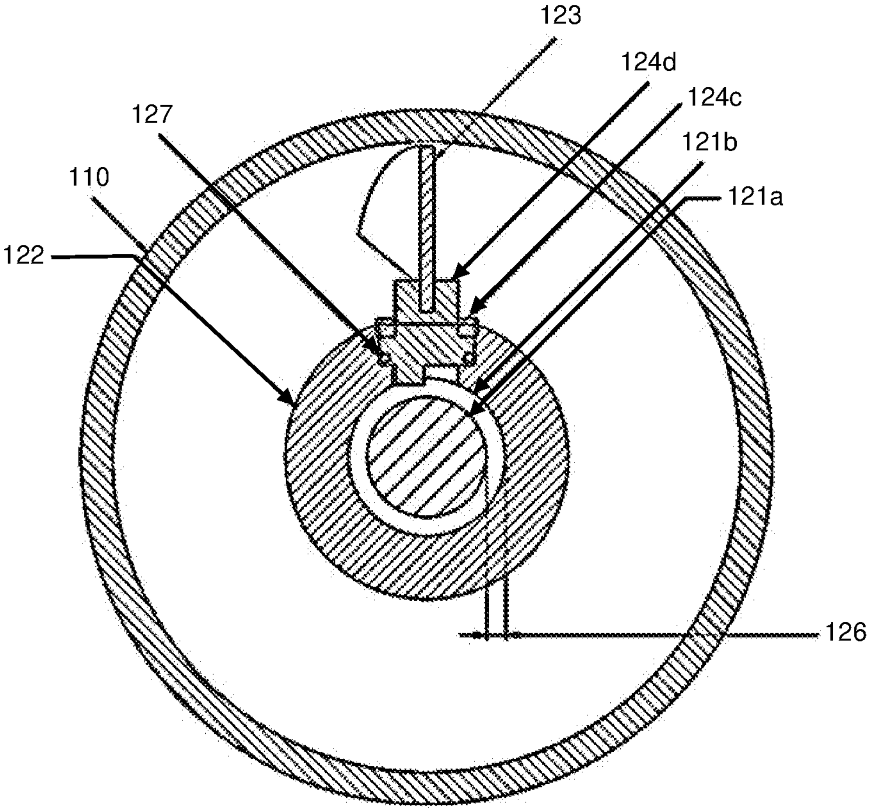
FIG. 5 illustrates a side view illustrating another exemplary embodiment of the mounting of the blade on the external shaft of the proposed blender, in accordance with an embodiment of the present disclosure.

FIG. 5 illustrates a side view illustrating another exemplary embodiment of the mounting of the blade on the external shaft of the proposed blender, in accordance with an embodiment of the present disclosure.

As illustrated, in another exemplary embodiment, the internal shaft 126 can include a plurality grooves 126 (also referred to as grooves 126, herein). The blade mounting assembly 124 can include a blade retention piece 124*c* and a blade mounting piece 124*d*.

In an embodiment, the grooves 126 can be equidistantly/non-equidistantly formed along the length of the internal shaft 121 between an inside diameter 121*a* and an outside diameter 121*b* of the internal shaft 121. The blade mounting piece 124*d* can be rotatably placed inside the external shaft 122 by a tapered threaded tapping means. This can provide rotational freedom to the blade mounting piece 124*d* and hence to the blades 123 which is clamped in the blade mounting piece 124*d*. To ensure that the blade mounting piece 124 is retained in the external shaft 122, the blade retention piece 127 can be clamped onto the external shaft 122 by threaded joints and sealing elements 127, which can be provided between the blade mounting piece 124*d* and the external shaft 122.

Figure 6:
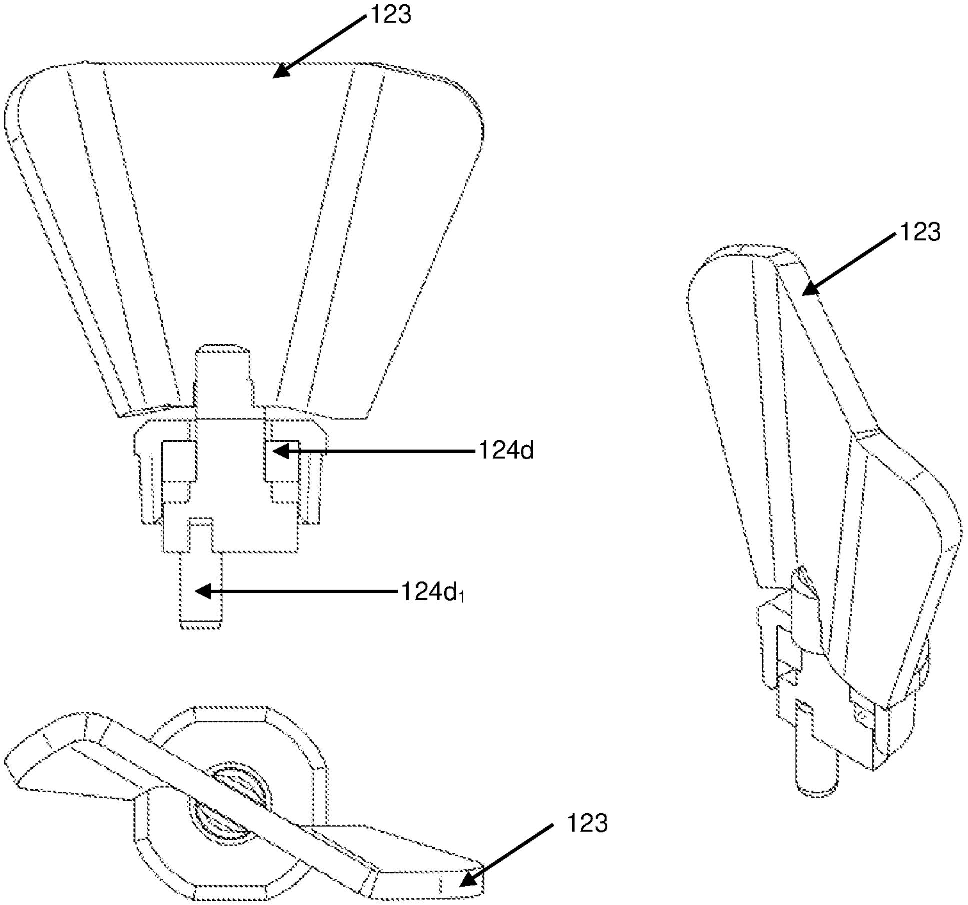
FIG. 6 illustrates an exemplary blade mounting piece with the customizable blade, in accordance with an embodiment of the present disclosure.

FIG. 6 illustrates an exemplary blade mounting piece with the customizable blade, in accordance with an embodiment of the present disclosure.

As illustrated, in an embodiment, the blade mounting piece 124*d* can include an extrusion 124*d*1 at a bottom end thereof. The extrusion 124*d*1 can be configured to engage with a slot or groove of the internal shaft 121. The blade mounting piece 124*d* can include the blades 123 removably coupled to it.

In an embodiment, a predefined number of blades and/or different type of blades 123 can be replaced or attached on the blade mounting assembly 124 at the predefined angle without having to change or dissemble the entire external shaft 122.

In an embodiment, the geometry of the blades 123 can be critical in mixing of the ingredients within the housing 110. The angles of the edges of the blades on either side can facilitate the back mixing and forward push of the ingredients within the housing simultaneously enabling proper mixing. In an exemplary embodiment, the edges of the blades 123 can have a suitable angle (as shown in FIG. 6) to facilitate back mixing and forward push of the ingredients inside the housing.

Figure 7:
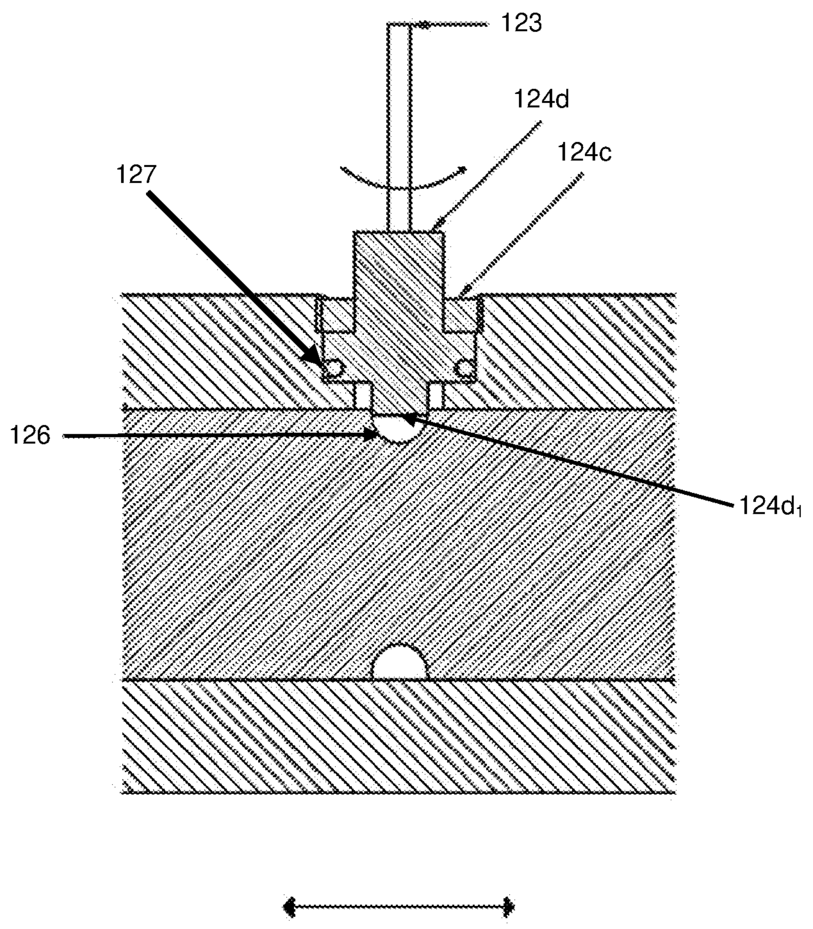
FIG. 7 illustrates a cross-sectional view illustrating yet another exemplary embodiment of the mounting of a blade on an external shaft of the proposed blender, in accordance with an embodiment of the present disclosure.

FIG. 7 illustrates a cross-sectional view illustrating yet another exemplary embodiment of the mounting of a blade on an external shaft of the proposed blender, in accordance with an embodiment of the present disclosure.

As illustrated, in yet another exemplary embodiment, the internal shaft 126 can include a plurality grooves 126 (also referred to as grooves 126, herein). The blade mounting assembly 124 can include a blade retention piece 124*c* and a blade mounting piece 124*d*. The blade mounting piece 124*d* can include an extrusion 124*d*1 at a bottom end thereof.

In an embodiment, the grooves 126 can be equidistantly/non-equidistantly formed along the length of the internal shaft 121. The blade mounting piece 124*d* can be rotatably placed inside the external shaft 122 by a tapered threaded tapping means. This can provide rotational freedom to the blade mounting piece 124*d* and hence to the blades 123 which is clamped in the blade mounting piece 124*d*. To ensure that the blade mounting piece 124 is retained in the external shaft 122, the blade retention piece 127 can be clamped onto the external shaft 122 by threaded joints and sealing elements 127, which can be provided between the blade mounting piece 124*d* and the external shaft 122.

In an embodiment, the placement of the blade mounting piece 124*d* in the external shaft can be such that the extrusion 124*d*1 at the bottom end of the blade mounting piece can be located in the groove 126 of the internal shaft 121, and the extrusion 124*d*1 abuts the surface of the internal shaft 121 within the groove 126.

In an embodiment, the engaging means can include a plurality of second slots (the grooves 126) provided on the outer surface of the internal shaft 121 such that the plurality of second slots can engage with a plurality of second extrusions (the extrusion 124*d*1) of the plurality of blade mounting assemblies 124.

In an embodiment, the linear sliding of the internal shaft 121 can cause the groove and the extrusion 124*d*1 therein to translate along with it, which in turn can cause the blade mounting piece 124*d* to be angularly displaced about its axis, and thereby the blades 123 to be angularly displaced about its axis. Thus, the combination of the groove 126 and the extrusion 123*d*1 can convert the linear motion of the internal shaft 121 into angular rotational motion of the blade mounting piece thereby changing the angle of orientation of the blades. This combination can also eliminate the need of a blade mounting housing as is used in the previous exemplary embodiment.

Referring to FIGS. 3 to 7, the mounting of the blade is illustrated. Without limiting the scope of the invention, and solely for the sake of brevity and understanding of the invention, the mounting of a single blade by a single blade mounting assembly on the external shaft is illustrated. It may be appreciated by person skilled in the art that each blade and blade mounting assembly is mounted in the similar manner on the external shaft, all falling within the scope of the present invention.

Without limiting the scope of the invention, and solely for the sake of brevity and understanding of the invention, the combination of a single groove formed in the internal shaft and an extrusion at a bottom end of a single blade mounting piece is illustrated. It may be appreciated by person skilled in the art that each groove is formed in a similar manner and the combination of each groove with the extrusion at the bottom end each blade mounting piece converts the linear motion of the internal shaft into angular rotational motion of each blade mounting piece to change the angle of orientation of each blade, all falling within the scope of the present invention

Advantages of the Invention

The proposed disclosure provides a continuous blender, which allows variation of angle of orientation of blades while the blender is in operation to provide better control over the blending parameters of the blender.

The proposed disclosure provides a continuous blender, which allows variation in mixing conditions by changing angle of orientation of blades.

The proposed disclosure provides a continuous blender with retrofittable blades, which can be quickly replaced in the event of their malfunctioning to facilitate easy maintenance of the continuous blender, thereby reducing the down time during maintenance and reduce cost for spare parts.

The proposed disclosure provides a continuous blender, which provides a homogenous mixture of pharmaceutical ingredients as per a desired blending efficiency or a changed formulation, which can be change in real time.

The proposed disclosure provides a continuous blender, which provides a homogenous mixture of pharmaceutical ingredients as per a desired blending efficiency or a changed formulation while the manufacturing process is going on.

The proposed disclosure provides a continuous blender, which allows variation of angle of orientation of blades without affecting the discharge flow velocity of the mixed/blended pharmaceutical ingredients.

The proposed disclosure provides a continuous blender, which automatically changes the angle of orientation of the blades and/or speed of rotation (RPM) of the blender.

The proposed disclosure provides a continuous blender, which contains sensors at the inlet and outlet to sense, monitor the blending parameters of the ingredients within the housing.

The proposed disclosure provides a continuous blender, which automatically changes mixing parameters based on feedback from a set of sensors to control the blending parameters within the specified range.

We claim:

1. A continuous blender comprising:

an external shaft comprising a bore, and a plurality of customizable blades rotatably mounted on an outer surface of the external shaft, each of the plurality of customizable blades are configured to change an angle of orientation, wherein the continuous blender is configured to change the angle of orientation of the plurality of customizable blades at a predefined angle in real time, at their corresponding position about an axis perpendicular to the central axis of the external shaft and simultaneously rotating the plurality of customizable blades about the central axis of the external shaft;

an internal shaft configured longitudinally inside the bore of the external shaft and adapted to move linearly inside the bore along the central axis along a length of the external shaft; and a plurality of blade mounting assemblies adapted to rotatably couple the plurality of customizable blades to the external shaft, wherein each of the plurality of blade mounting assemblies comprises a blade mounting housing and a blade mounting piece, the blade mounting piece is rotatably placed inside the blade mounting housing by a tapered threaded tapping means, and the blade mounting housing is clamped to the external shaft with a clearance between a bottom surface of the blade mounting housing and the internal shaft, wherein the plurality of customizable blades are coupled with a plurality of engaging means positioned on an outer surface of the internal shaft such that each of the plurality of engaging means engages with the corresponding blade and said each of the plurality of customizable blades are adapted to rotate based on the linear motion of the internal shaft and movement of the each of the plurality of customizable blades facilitates blending and shifting of one or more ingredients inside the continuous blender.

2. The continuous blender as claimed in claim 1, wherein the external shaft is configured longitudinally inside a housing, the housing comprising at least two inlets to facilitate inflow of one or more ingredients into the housing, and at least one outlet to exit the blended one or more ingredients from the housing.

3. The continuous blender as claimed in claim 2, wherein the at least one outlet comprises a first sensor to monitor one or more parameters of the one or more exiting ingredients from the housing to thereby control the continuous blender based on the one or more monitored parameters.

4. The continuous blender as claimed in claim 3, wherein the at least one outlet is controlled based on the one or more monitored parameters.

5. The continuous blender as claimed in claim 1, wherein the continuous blender comprises:

a first driving unit coupled to the external shaft to rotate the external shaft about the central axis, wherein the rotation of the external shaft enables rotation of the internal shaft, and the plurality of customizable blades about the central axis to facilitate blending of the one or more ingredients; and a second driving unit rotatably coupled to the internal shaft and configured to enable linear movement of the internal shaft inside the bore of the external shaft along the central axis;

wherein the linear movement of the internal shaft along the central axis facilitates the linear movement of the plurality of engaging means to rotate the plurality of customizable blades at a predefined angle, at their corresponding position about an axis perpendicular to the central axis of the external shaft.

6. The continuous blender as claimed in claim 1, wherein said each of the plurality of customizable blades comprises a pin configured to couple with an associated engaging means selected from the plurality of engaging means positioned on the outer surface of the internal shaft.

7. The continuous blender as claimed in claim 1, wherein the plurality of customizable blades are removably coupled to the plurality of blade mounting assemblies.

8. The continuous blender as claimed in claim 7, wherein the plurality of engaging means comprises a plurality of first extrusions positioned on the outer surf ace of the internal shaft such that the plurality of first extrusions engage with a plurality of first slots of the plurality of blade mounting assemblies.

9. The continuous blender as claimed in claim 1, wherein the plurality of customizable blades are positioned at predefined positions on the outer surface of the external shaft along the length of the external shaft and circumferentially around the external shaft such that no gap is present between at least one edge of each of the two adjacent customizable blades along the length of the external shaft.

10. The continuous blender as claimed in claim 2, wherein the continuous blender comprises at least two first valves configured at the at least two inlets to control the inflow of the one or more ingredients into the housing, and wherein the continuous blender comprises a second valve configured at the at least one outlet to control the outflow of the blended one or more ingredients from the housing.

11. The continuous blender as claimed in claim 10, wherein the continuous blender comprises one or more sensors configured to monitor one or more blending parameters of the continuous blender in real-time and generate a first set of signals corresponding to the monitored one or more blending parameters, and wherein the one or more blending parameters comprises any or a combination of rotational speed of the external shaft, linear displacement of the internal shaft, angle of the plurality of customizable blades, inflow of the one or more ingredients into the housing, outflow of the blended one or more ingredients from the housing.

12. The continuous blender as claimed in claim 11, wherein the continuous blender comprises a control unit operatively coupled to the one or more sensors, a first driving unit, a second driving unit, the at least two first valves, the at least one second valve, and wherein the control unit is configured to receive the first set of signals form the one or more sensors, and send a second set of signals to any or a combination of the first driving unit, the second driving unit, the at least two first valves, the at least one second valve to configure the one or more parameters of the continuous blender.

13. The continuous blender as claimed in claim 1, wherein the plurality of customizable blades are configured to facilitate back mixing and forward pushing of the one or more ingredients within a housing.

* * * * *